United States Patent

Cloos

[11] 4,024,374
[45] May 17, 1977

[54] GUIDE TUBE FOR AN ARC WELDING GUN

[75] Inventor: Erwin Cloos, Haiger, Germany

[73] Assignee: Die Firma Carl Cloos, Haiger, Dillkries, Germany

[22] Filed: Dec. 29, 1975

[21] Appl. No.: 645,200

Related U.S. Application Data

[63] Continuation of Ser. No. 486,163, July 5, 1974, abandoned.

[30] Foreign Application Priority Data

July 6, 1973 Germany ............................ 2334335

[52] U.S. Cl. .............................. 219/130; 339/268 S
[51] Int. Cl.² ............................................. B23K 9/12
[58] Field of Search ................ 219/73 A, 73 R, 130, 219/136; 339/268 S, 268 R

[56] References Cited

UNITED STATES PATENTS

| 3,226,526 | 12/1965 | Shearer, Jr. | 219/130 |
| 3,534,389 | 10/1970 | Bernard et al. | 219/130 |
| 3,728,514 | 4/1973 | Bernard et al. | 219/136 X |

Primary Examiner—J. V. Truhe
Assistant Examiner—N. D. Herkamp
Attorney, Agent, or Firm—Woodhams, Blanchard and Flynn

[57] ABSTRACT

Guide tube for an arc welding gun. The normal threaded connection between the guide tube in an arc welding gun and the holder for same has been improved for the purposes of electrical transmission by utilizing tapered threading for same. Particularly it has been found that the electrical conductivity through said parts is substantially improved if such conical threading is of such design that the conicity of the thread is at a ratio of 1:16 ± 20 percent.

3 Claims, 4 Drawing Figures

GUIDE TUBE FOR AN ARC WELDING GUN

This is a continuation of application Ser. No. 486,163, filed July 5, 1974, now abandoned.

FIELD OF THE INVENTION

The invention relates to a guide tube (also known as a contact tip) for arc welding guns with a bore for guiding a consumable wire electrode and for the transmission of current to the wire electrode and with a threaded connecting part for fixing the guide tube (contact tip) to a guide tube holder (also known as head member).

BACKGROUND OF THE INVENTION

The feed of the wire electrode to the welding gun is effected, among other ways, by means of a welding current cable constructed as a hollow conductor. Inside the welding gun the cable is connected to a supply tube to the outer end of which is fixed a holder for the guide tube. The welding current is supplied by way of the nozzle to the wire electrode which is guided through a bore in the guide tube. In order to obtain good electrical conductivity the guide tube is produced from a hard copper alloy. The guide tube, which is situated close to the welding point during the welding process, heats up considerably through the heat radiated from the welding point, through the heat transmitted from the wire electrode to the guide tube and through the relatively strong welding current which flows therethrough. In the known guide tubes the temperatures recorded at the tips reach 500° – 600° C. The effect of this marked heating of the guide tube is that its conductivity drops to fractions of the original. The consequence is that the heat losses caused by the current flow in the guide tube become very great. The poor conductivity also entails a deterioration in the transfer of current from the guide tube to the wire electrode, there is a rise in the electrical transition resistance and the wire electrode seizes and sticks to the guide tube. The result is that the wire electrode no longer travels uniformly through the tube but begins to sputter.

In the case of air-cooled welding guns heat is dissipated from the guide tube mainly by way of welding current cable into the air. To keep down the temperature of the guide tube even with fairly high welding capacities, the gun is cooled additionally by water. In spite of this water cooling the guide tubes still reach temperatures of 500° – 600° C. The cause of this, since the heat must first be transmitted predominantly from the guide tube to the guide tube holder, resides in the poor transfer of heat from guide tube to holder. Since the guide tube is a part subject to wear, it must be easily replaceable. The guide tube is usually connected to the holder in a nut and bolt manner. In most cases the guide tube has a screw thread which is screwed into a threaded, cylindrical bore in the holder until the guide tube is pressed firmly by its bearing face against the holder. The transfer of heat from the guide tube to the holder takes place mainly by way of the threaded part. However, this known manner of fixing permits no optimal heat transfer between the tube and the holder. To allow an adequate heat transfer in the case of high welding capacities, the threaded part of the guide tube and the bore in the holder must be made substantially bigger than is required for fixing the guide tube. However, this results in welding guns which are distinctly unwieldy.

The problem underlying the invention is to design the fixture of a guide tube of the type mentioned initially in a guide tube holder in such a way that, for the same space requirement for guide tube and holder, there is a substantial improvement in the heat transfer between the guide tube and the holder by comparison with the known fixtures.

SUMMARY OF THE INVENTION

This problem is solved according to the invention through the fact that the thread on the connecting part of the guide tube and the thread formed in the guide tube holder are tapered. In a preferred embodiment of the invention the connecting part fixed to the guide tube is in the form of a screw and the front end of the holder is in the form of a nut.

By comparison with the cylindrical thread the tapered thread has the advantage that when the screw is fully tightened both side flanks of each thread are in contact with the side flanks of the nut which are opposite them, whereas with a cylindrical thread there is only one side flank at a time in contact with a side flank of the nut. From this fact alone it follows that the surface available for the transmission of heat from the guide tube to the holder is only half as big in the case of a cylindrical thread as in that of a tapered thread. In addition, with a cylindrical thread in which the screw is subjected to tension there is no guarantee that all the turns of the thread will even come to bear. Thus the surface available for heat transmission is even less than previously indicated. Since, furthermore, the cylindrical thread cannot extend all of the way to the head of the screw and has to end in an undercut here so that the head of the screw can be tightly clamped to the nut, a further portion of the part of the screw which is screwed into the nut is lost for the purpose of heat transmission. With the dimensions of guide tubes concerned, this undercut may amount to anything up to 30% of the surface available for heat transmission. With a tapered thread on the other hand, both side flanks are brought to bear since the screw tends to exert force on the nut and thus the side flanks are pressed against one another. Again, since no undercut is necessary the whole of the screw portion which is screwed into the nut contributes to the heat transmission. Hence by using a tapered thread it is possible, with the same external dimensions, to more than double the surface available for heat tranmission by comparison with a cylindrical screw.

Measurements have shown that with a guide tube of the conventional type of construction, with a definite capacity, difficulties arose in the wire feed even at 300 amperes welding current, whereas with a guide tube constructed according to the invention, of the same dimensions, there are still no difficulties at 400 amperes welding current. At the same time the quantity of heat resulting at 400 amperes is almost twice that at 300 amperes. Thus the guide tubes provided with a tapered thread in accordance with the invention give the advantage that welding guns fitted with these can be employed for greater loads and are subjected to less wear. The lesser wear on the welding gun can be explained by the fact that the forces which occur during seizing and the braking of the wire electrode caused by this are now absent. These forces account for increased wear on wire guiding tubes, wire feed rolls, etc.

BRIEF DESCRIPTION OF THE DRAWINGS

An exemplified embodiment of the invention is described more fully below with reference to the drawing in which the figures are as follows.

DETAILED DESCRIPTION

Figure 1:
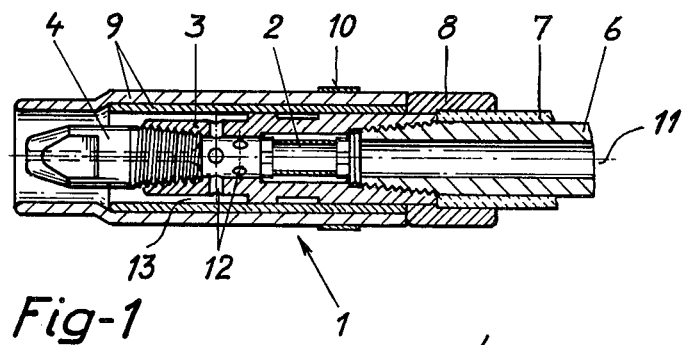
FIG. 1 shows the front end of a gun head according to the invention, in section.
Figure 2:
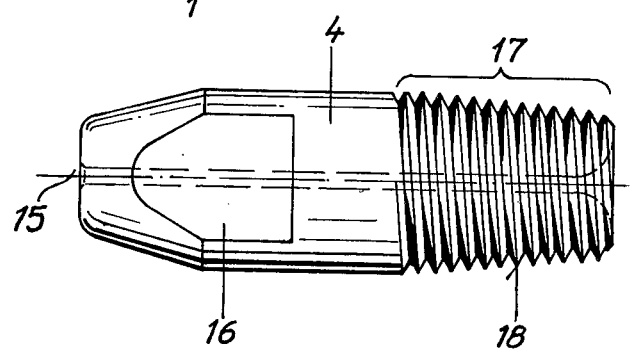
FIG. 2 shows an elevation of a guide tube according to the invention, on a larger scale.
Figure 3:
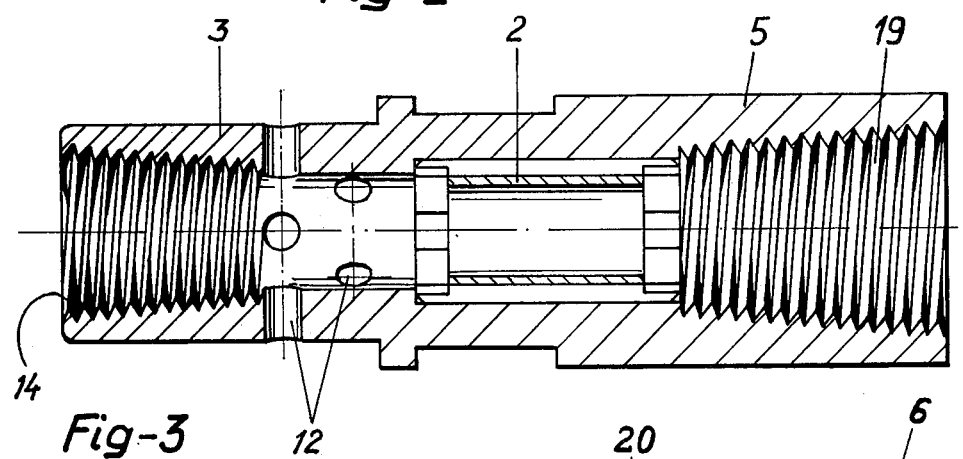
FIG. 3 shows a guide tube holder, in section.
Figure 4:
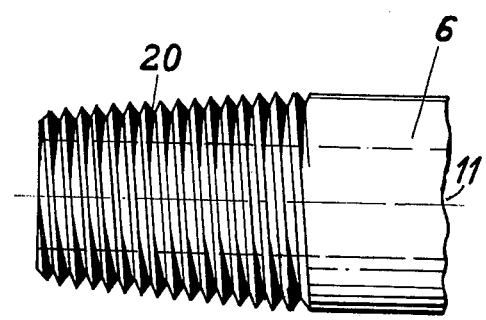
FIG. 4 shows the front end of the supply tube in elevation.

In FIG. 1 the head of a welding gun is given the overall reference 1. The gun head consists of a gas distributor insert 2, the front end of which is constructed as a guide tube holder 3 (also known as a head member). Screwed into the guide tube holder 3 is a monolithic guide tube (also known as a contact tip) 4. The rear end 5 (FIG. 3) of the gas distributor insert 2 is connected with a supply tube 6 which is clamped in the handle of the welding gun (not shown). A protective hose 7 is pushed over the supply tube 6 and clamped fast to the gun head 1 by means of a fixing bushing 8.

Pushed over the gas distributor insert 2 and the guide tube 4 is a tube 9, acting as a gas nozzle, with an insulating insert, which is held by a clamping spring 10 on the rear end 5 of the gas distributor insert 2.

The gas distributor insert 2 has an axial bore which is in communication with that of the supply tube 6. A plurality of radial bores 12, communicating with the bore 11, allow the gas to pass out into an annular channel 13 from which it passes out of the gun head 1 through the gap formed between the guide tube 4 and the gas nozzle 9.

The rear end 17 of the guide tube 4 has a tapered external thread 18 with a conicity of approximately 3.2°. The front end 3 of the gas distributor insert, i.e. the guide tube holder, has a corresponding tapered internal thread. The guide tube 4 also has an axial bore 15, which is matched to the diameter of the wire electrode, and two key faces 16.

The rear end 5 of the gas distributor insert 2 and the front end of the supply tube 6 likewise have mutually corresponding tapered threads 19, 20 so that at this point also a good transfer of heat is achieved.

Although a particular preferred embodiment of the invention has been disclosed above for illustrative purposes, it will be understood that variations or modifications thereof which lie within the scope of the appended claims are fully contemplated.

The embodiments of the invention in which an exclusive property or privilege is claimed are defined as follows:

1. In an electrically conductive guide tube for an arc welding gun having a bore therethrough with the inner surface of said bore electrically contacting and guiding a consumable type wire electrode out of free end thereof and an electrically conductive guide tube holder for holding said guide tube, said free end of said guide tube, while in use, being free of any connection to a further element, the improvement comprising wherein said guide tube is a monolithic member free of lateral slots communicating with said bore and having an external first conically tapered connecting part thereon remote from said free end and an external first tapered thread on said first conically tapered connecting part, said guide tube holder having a recess therein and an internal second conically tapered connecting part in said recess and an internal second tapered thread on said second conically tapered connecting part, said first and second tapered threads being threadedly engaged so that both sides of the side flanks of each thread on said guide tube are in contact with both sides of the side flanks of each thread on said guide tube holder, whereby welding electrical current supplied to said guide tube holder will pass through said threadedly engaged first and second tapered threads to said monolithic guide tube and directly to said wire electrode and the heat generated by the transmission of said welding current will be effectively transmitted through said threadedly engaged first and second tapered threads.

2. The improvement according to claim 1, wherein the conicity of said tapered thread is around 1:16 ± 20 percent.

3. The improvement according to claim 1, wherein the end of said guide tube holder remote from said second tapered thread has a third tapered thread thereon threadedly engaged with a fourth tapered thread on a gas supply tube.

* * * * *